United States Patent [19]
Ohta

[11] Patent Number: 4,647,768
[45] Date of Patent: Mar. 3, 1987

[54] IMAGE SENSING HEAD FOR DOCUMENT SCANNING
[75] Inventor: Eiichi Ohta, Handa, Japan
[73] Assignee: Brother Industries, Ltd., Nagoya, Japan
[21] Appl. No.: 695,258
[22] Filed: Jan. 28, 1985
[30] Foreign Application Priority Data
Feb. 3, 1984 [JP] Japan .............................. 59-14755[U]
[51] Int. Cl.$^4$ .......................... H01J 5/16; G06K 7/14; G06K 7/08; G11B 5/12
[52] U.S. Cl. .................................... 250/227; 250/216; 250/239; 235/454; 235/473; 355/1
[58] Field of Search ............... 250/200, 216, 578, 221, 250/222.1, 224, 237 R, 552, 553, 208, 239, 227; 355/1, 8, 11, 67, 68, 70; 365/112; 382/65, 67; 235/435, 439, 454, 455, 470, 473

[56]  References Cited
U.S. PATENT DOCUMENTS
4,052,594 10/1977 Davis ............................... 360/110 X
4,359,636 11/1982 Stauffer ............................... 250/239

FOREIGN PATENT DOCUMENTS
1392623 4/1975 United Kingdom ................ 235/473

Primary Examiner—Eugene R. LaRoche
Assistant Examiner—David Mis
Attorney, Agent, or Firm—Kane, Dalsimer, Kane, Sullivan and Kurucz

[57] ABSTRACT

An image sensing head including a block, a multiplicity of light emitting optical fibers, a multiplicity of light receiving optical fibers, a multiplicity of light emitting elements connected to the light emitting optical fibers and a multiplicity of light receiving elements connected to the light receiving optical fibers. A thin sheet formed with an opening in a portion thereof which faces the sensing end portions of the light emitting and light receiving optical fibers is attached to one side of the image sensing head, so that a predetermined clearance can be maintained between the sensing side end portions of the light emitting and light receiving optical fibers and a document surface to be sensed by the image sensing head.

3 Claims, 5 Drawing Figures

IMAGE SENSING HEAD FOR DOCUMENT SCANNING

BACKGROUND OF THE INVENTION (1) Field of the Invention

This invention relates to an image sensing head using optical fibers.

(2) Description of the Prior Art

In this type of image sensing head, image sensing end portions of optical fibers are exposed at one side of the image sensing head which is positioned against one surface of a document. End portions of the optical fibers on light emitting and light receiving sides are exposed to an opposite side of the image sensing head, with light emitting elements being connected to the end portions of the optical fibers on the light emitting side and light receiving elements being connected to the end portions of the optical fibers on the light receiving side. Light beams emitted by the light emitting elements are transmitted via the optical fibers on the light emitting side and irradiate sensed points on the surface of the document from the image sensing end portions of the optical fibers on the light emitting side. Light beams reflected by the sensed points on the surface of the document are condensed by the image sensing end portions of the optical fibers on the light receiving side. In the image sensing head of the construction described hereinabove, there are two requirements that should be met. One of them is that since the clearance between the image sensing end portions of the optical fibers and the one surface of the document has an important role in improving the performance of the image sensing head, the clearance should be considered an important factor. The other requirement is that, to avoid irregular emission of light beams emitted from the image sensing end portions of the optical fibers to the sensed points and irregular reflection of light beams reflected by the sensed points, it is necessary that the image sensing end portions of the optical fibers be polished to achieve a mirror surface finish.

To meet the two requirements noted hereinabove, it has hitherto been the usual practice to polish the image sensing end portions of the optical fibers after the image sensing head is formed, then to firmly secure a spacer to one side of the image sensing head, and thereafter to polish the surface of the spacer facing the document so as to bring the one surface of the document and the surface of the spacer facing the document to a condition in which they are parallel to each other while being spaced apart from each other by a predetermined clearance. The operation described hereinabove is not only time-consuming and troublesome but increases the costs involved because of the need to polish the image sensing end portions of the optical fibers and the surface of the spacer.

SUMMARY OF THE INVENTION (1) Object of the Invention

This invention has been developed for the purpose of obviating the aforesaid disadvantages of the prior art. Accordingly, the invention has as its object of an image sensing head capable of being readily produced trouble-free at low costs while being able to maintain a predetermined clearance between the image sensing end portions of the optical fibers and the surface of a document.

(2) Statement of the Invention

The aforesaid object is accomplished according to the invention by providing thin sheet means formed with an opening in a portion thereof which is in face-to-face relation to the sensing side end portions of the optical fibers and secured to the image sensing head so that a predetermined clearance can be provided between the image sensing end portion of the optical fibers and the surface of the document by virtue of the thickness of the thin sheet means. The invention provides an image sensing head with a high efficiency performance at low costs without any trouble.

DESCRIPTION OF THE PREFERRED EMBODIMENTS

Preferred embodiments of the invention will now be described with reference to the accompanying drawings.

Figure 1:
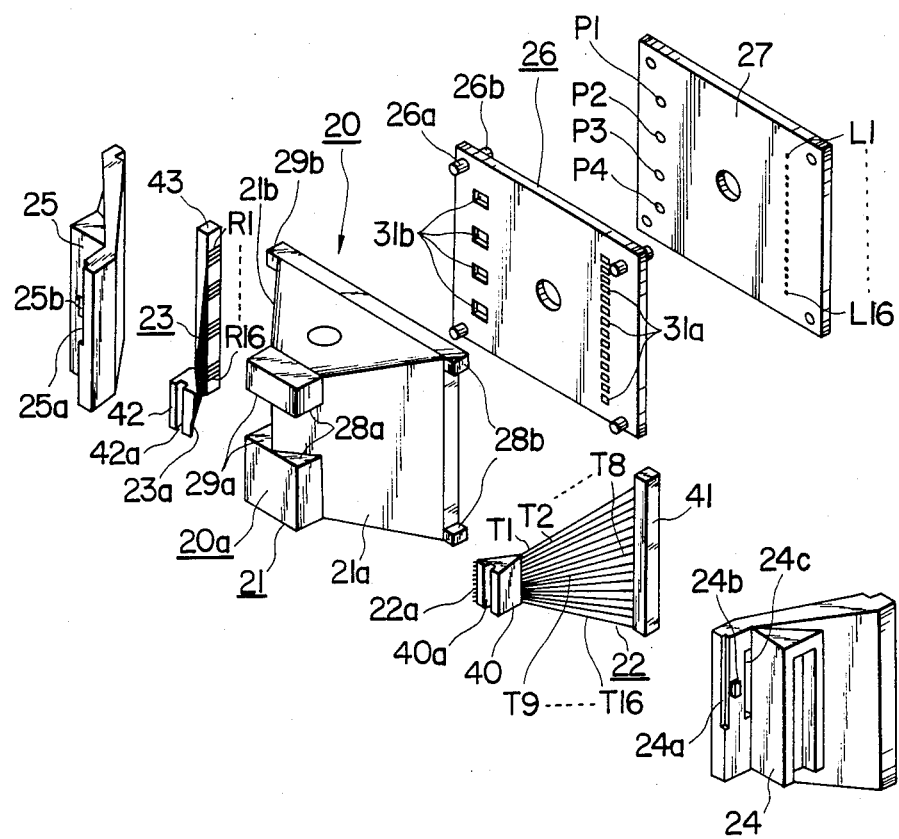
FIG. 1 is an exploded perspective view of an image sensing head.

FIG. 1 shows an image sensing head 20 comprising one embodiment of the invention which comprises a center block 21, an optical fiber sheet 22 of the light emitting side, an optical fiber sheet 23 of the light receiving side, side covers 24 and 25 formed of a synthetic resinous material by injection molding, a light shield plate 26 and a base plate 27.

The center block 21 is formed of a synthetic resinous material by injection molding in such a manner that the left and right side surfaces 21a and 21b thereof cross each other at an angle of 60 degrees in the front of the center block 21. A pair of upper and lower fixing portions 28a and 29a for fixing thereto first support members 40 and 42, respectively, which are presently to be described, are formed integrally with the center block 21 on the front surfaces of the left and right side surfaces 21a and 21b thereof. A pair of upper and lower fixing portions 28b and 29b for fixing thereto second support members 41 and 43, respectively, which are presently to be described, are formed integrally with the center block 21 on the rear surfaces of the left and right side surfaces 21a and 21b thereof.

The optical fiber sheet 22 of the light emitting side comprises the first to sixteenth light emitting optical fibers $T_1$–$T_{16}$ arranged vertically from above, and the first and second support members 40 and 41 for supporting the first to sixteenth light emitting optical fibers $T_1$–$T_{16}$ in the form of a sheet. The sensing side end portions 22a of the first to sixteenth light emitting optical fibers $T_1$–$T_{16}$ are disposed in holding grooves, not shown, formed in the first support member 40 and spaced apart from each other in accordance with a pitch of the sensed point on the document surface 9, not shown and secured adhesively in the holding grooves. The light emitting side end portions of the first to sixteenth light emitting optical fibers $T_1$–$T_{16}$ are disposed in holding grooves, not shown, formed in the second support member 41 and spaced apart from each other by a pitch equal to the arranged pitch of light emitting elements $L_1$–$L_{16}$ presently to be described and secured adhesively in the holding grooves.

The optical fiber sheet 23 of the light receiving side comprises the first to sixteenth light receiving optical fibers $R_1$–$R_{16}$ arranged vertically from above, and the first and second support members 42 and 43 for supporting the first to sixteenth light receiving optical fibers $R_1$–$R_{16}$ in the form of a sheet. Sensing side end portions 23a of the first to sixteenth light receiving optical fibers $R_1$–$R_{16}$ are disposed in holding grooves, not shown, formed in the first support member 42 and spaced apart from each other by a pitch equal to the pitch of the first to sixteenth light emitting optical fibers $T_1$–$T_{16}$ and secured adhesively in the holding grooves. The light receiving end portions of the first to sixteenth light receiving optical fibers $R_1$–$R_{16}$ are disposed in holding grooves, not shown, formed in the second support member 43 and spaced apart from each other by a pitch equal to the arranged pitch of the light receiving elements $P_1$–$P_{16}$ presently to be described and secured adhesively in the holding grooves.

The light receiving side end portions of the first to sixteenth light receiving optical fibers $R_1$–$R_{16}$ are arranged such that the light receiving optical fibers $R_1$, $R_3$, $R_5$ and $R_7$, the light receiving optical fibers $R_2$, $R_4$, $R_6$ and $R_8$, the light receiving optical fibers $R_9$, $R_{11}$, $R_{13}$ and $R_{15}$ and the light receiving optical fibers $R_{10}$, $R_{12}$, $R_{14}$ and $R_{16}$ are positioned against the light receiving element $P_1$, the light receiving element $P_2$, the light receiving element $P_3$ and the light receiving element $P_4$, respectively. The optical fiber sheet 22 of the light emitting side and the optical fiber sheet 23 of the light receiving side are mounted to the center block 21 and located on the left and right side surfaces 21a and 21b respectively by fitting the first and second support members 40 and 41 to the fixing portions 28a and 28b, respectively, and securing same and by fitting the first and second support members 42 and 43 to the fixing portions 29a and 29b, respectively, and securing same. When the optical fiber sheets 22 and 23 are mounted to the center block 21 as aforesaid, the sensing end side portions 22a and 23a of the first to sixteenth light emitting optical fibers $T_1$–$T_{16}$ and the first to sixteenth light receiving optical fibers $R_1$–$R_{16}$ respectively are exposed at the front surface of the center block 21 of the image sensing head 20, and the light emitting side end portions and light receiving side end portions of the first to sixteenth light emitting optical fibers $T_1$–$T_{16}$ and the first to sixteenth light receiving optical fibers $R_1$–$R_{16}$ respectively are exposed at the rear surface of the center block 21.

The side covers 24 and 25 are secured adhesively to the left and right side surfaces 21a and 21b of the center block 21 to which the optical fiber sheet 22 of the light emitting side and the optical fiber sheet 23 of the light receiving side are secured, respectively, in such a manner that the side covers 24 and 25 enclose the fiber sheets 22 and 23, respectively. Thus, the front surface of the center block 21, the front surfaces of the first support members 40 and 42 and the front surfaces of the side covers 24 and 25 constitute one side 20a of the image sensing head 20.

The light shield plate 26 is secured to the rear surface of the center block 21 and formed with a multiplicity of apertures 31a and 31b corresponding to the light emitting side end portions of the first to sixteenth light emitting optical fibers $T_1$–$T_{16}$ and the light receiving side end portions of the first to sixteenth light receiving optical fibers $R_1$–$R_{16}$, respectively. Pins 26a and 26b are formed integrally with the light shield plate 26 on the front and rear surfaces thereof for positioning the light shield plate 26 with respect to the center block 21 and the base plate 27, respectively. Thus, when the image sensing head 20 is assembled, relative positioning of the center block 21 with respect to the light shield plate 26 can be readily effected by means of the pins 26a and 26b.

The base plate 27 is secured adhesively to the rear surface of the light shield plate 26. The light emitting elements $L_1$–$L_{16}$ corresponding to the light emitting side end portions of the first to sixteenth light emitting optical fibers $T_1$–$T_{16}$ and the light receiving elements $P_1$–$P_4$ corresponding to the light receiving side end portions of the light receiving optical fibers $R_1$–$R_{16}$ are located on the base plate 27 with a predetermined pitch. The light emitting elements $L_1$–$L_{16}$ and light receiving elements $P_1$–$P_4$ are electrically connected to a main body frame, not shown, via flexible cables, not shown, in the form of a substrate having a multiplicity of electric wires printed thereon. The light receiving elements $P_1$–$P_{14}$ each have an amplifier circuit built therein to provide a unitary structure.

The first support members 40 and 42 are formed with grooves 40a and 42a, respectively, at front surfaces thereof which extend in the direction in which the sensing side end portions 22a and 23a of the light emitting and the light receiving optical fibers $T_1$–$T_{16}$ and $R_1$–$R_{16}$ are arranged vertically. The side covers 24 and 25 are formed with the notch portions 24a and 25a at the corners of the front end faces thereof, with protrusions 24b and 25b at side surfaces thereof and with grooves 24c and 25c at the side surfaces thereof, respectively.

Figure 2:
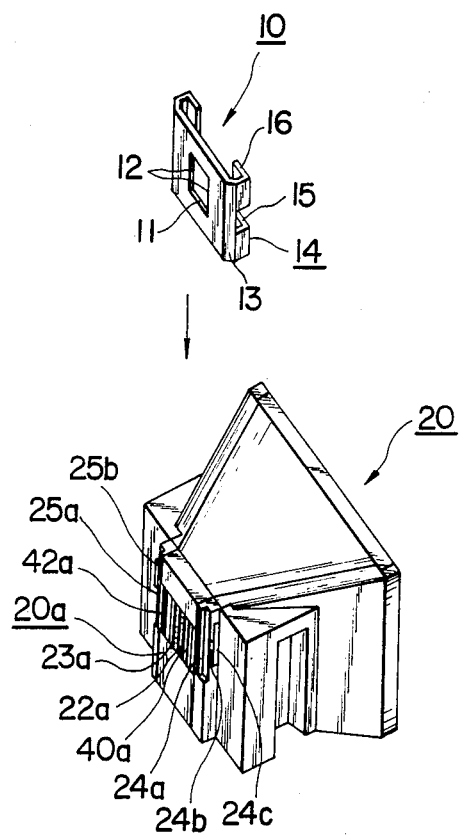
FIG. 2 is a perspective view of the image sensing head and the thin sheet means secured to one side of the image sensing head comprising one embodiment of the invention.
Figure 3:
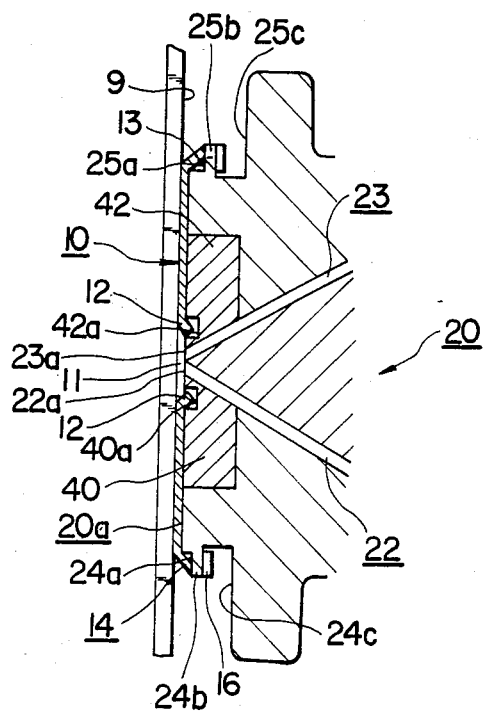
FIG. 3 is a sectional view, shown on an enlarged scale, of the image sensing head and the thin sheet means shown in FIG. 2, showing the latter being secured to the former.

The image sensing head of the construction described in detail hereinabove is assembled as shown in FIG. 2. Then, the one side 20a of the image sensing head 20 is polished in such a manner that the sensing side end portions 22a of the light emitting optical fibers $T_1$–$T_{16}$ and the sensing side end portions 23a of the light receiving optical fibers $R_1$–$R_{13}$ can have a mirror surface finish. Thereafter, the thin sheet means 10 shown in FIG. 2 is attached to the one side 20a of the image sensing head 20 as presently to be described in such a manner that the thin sheet means 10 covers the one side 20a while being maintained in intimate contact therewith, so that a predetermined clearance can be maintained between the document surface 9 and the sensing side end portions 22a and 23a as shown in FIG. 3. The thin sheet means 10 may be formed from a sheet of stainless steel of 0.2 mm thick which is commercially available. One surface of the thin sheet means 10 of stainless steel disposed in face-to-face relation to the one side 20a of the image sensing head 20 and an opposite side of the thin sheet means 10 disposed in face-to-face relation to the document surface 9 are parallel to each other, thereby enabling a predetermined clearance to be maintained between the document surface 9 and the sensing side end portions 22a and 23a without any trouble.

The thin sheet means 10 is formed with an opening 11 in a portion thereof which is in face-to-face relation to the sensing side end portions 22a and 23a of the light emitting and light receiving optical fibers 22 and 23 respectively. The opening 11 is formed with the opposite edge portions 12 which are arranged in the direction of the movement of the image sensing head 20 which moves in a direction perpendicular to the direction in which the sensing side end portions 22a and 23a are arranged, and said opposite edge portions 12 are bent in a direction in which they move away from the document surface 9. The opposite edge portions 12 are inserted in the grooves 40a and 42a and prevent the image sensing head 20 from catching against the document surface 9 when the former moves along the latter. The opposite end portions 13 of the thin sheet means 10 are also bent in a direction in which the opposite end portions 13 move away from the document surface 9. This arrangement can achieve the same effect as the aforesaid arrangement where the opposite edge portions 12 of the opening 11 are bent in the direction in which they move away from the document surface 9.

The thin sheet means 10 comprises the mounting sections 14 extending from the opposite end portions 13 toward the image sensing head 20 and including the notch portions 15 and engaging portions 16. The protrusions 24b and 25b at the side surfaces of the side covers 24 and 25 respectively are fitted in the notch portions 15 while the engaging portions 16 are bent for engagement with the grooves 24c and 25c at the side surfaces of the side covers 24 and 25, respectively. Thus, the thin sheet means 10 is attached to the one side 20a of the image sensing head 20 by the notch portions 15 and the engaging portions 16 in engagement with the protrusions 24b and 25b and the grooves 24c and 25c of the side covers 24 and 25, respectively.

The image sensing operation of the image sensing head 20 will now be described. The image sensing head 20 is arranged such that it is capable of movement along the document surface 9 in a direction which is perpendicular to the direction in which the sensing side end portions 22a and 23a of the light emitting and light receiving optical fibers 22 and 23 respectively are arranged while the document surface 9 can be moved in the direction in which the sensing side end portions 22a and 23a are arranged. As the image sensing head 20 is intermittently moved in the direction perpendicular to the direction in which the sensing side end portions 22a and 23a are arranged, the light emitting elements $L_1$–$L_{16}$ are successively turned on and off starting with the light emitting element $L_1$ and ending with the light emitting element $L_{16}$ according to the time division system each time the image sensing head 20 is brought to a halt. Light beams emitted by the light emitting optical fibers $L_1$–$L_{16}$ are transmitted via the first to sixteenth light emitting optical fibers $L_1$–$L_{16}$ respectively, and successively incident on sensed points on the document surface 9 to irradiate same. Light beams reflected by the sensed points are transmitted via the first to sixteenth light receiving optical fibers $R_1$–$R_{16}$ to the first to fourth light receiving elements $P_1$–$P_4$, respectively, which produce electric signals corresponding to the volume of light of the reflected light beams, to thereby sense the image at the sensed points on the document surface 9.

Figure 4:
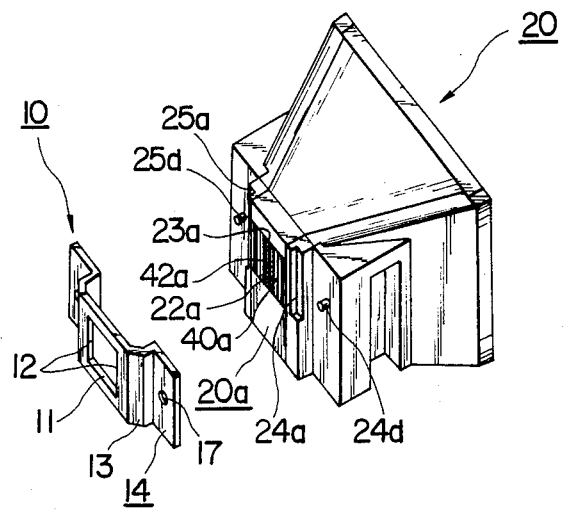
FIG. 4 is a view similar to FIG. 2 but showing the image sensing means and the thin sheet means comprising another embodiment.
Figure 5:
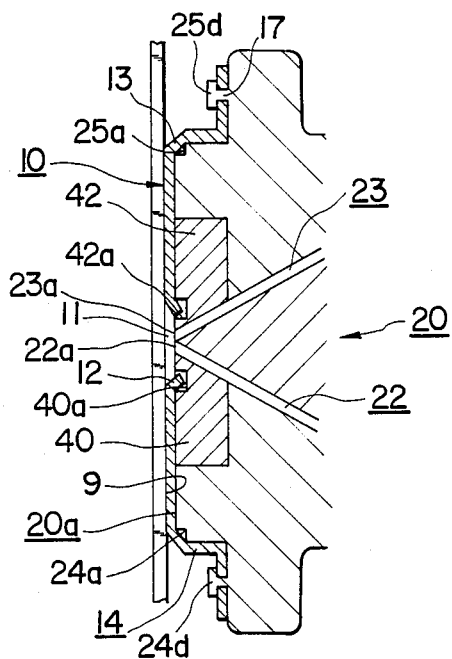
FIG. 5 is a view similar to FIG. 3 but showing the image sensing head and the thin sheet means shown in FIG. 4, showing the latter being secured to the former.

Another embodiment of the invention will be described with reference to FIGS. 4 and 5. This embodiment is distinct from the embodiment shown in FIGS. 2 and 3 in that the protrusions 24b and 25b and the grooves 24c and 25c of the embodiment shown in FIGS. 2 and 3 are replaced by pin-like projections 24d and 25d formed integrally on the front surfaces of the side covers 24 and 25 in the embodiment shown in FIGS. 4 and 5 and that the notch portions 15 and engaging portions 16 of the mounting sections 14 of the embodiment shown in FIGS. 2 and 3 are replaced by apertures 17 formed in the mounting sections 14 for receiving the pin-like projections 24d and 25d in the embodiment shown in FIGS. 4 and 5. In other respects, the embodiment shown in FIGS. 4 and 5 is similar to that shown in FIGS. 2 and 3. In attaching the thin sheet means 10 to the one side 20a of the image sensing head 20, the pin-like projections 24d and 25d of the side covers 24 and 25 are fitted in the apertures 17 formed in the thin sheet means 10 in such a manner that the thin sheet means 10 is disposed in intimate contact with the one side 20a of the image sensing head 20 to cover same, and then the head portions of the pin-like projections 24d and 25d are melted to adhere to the mounting sections 14 of the thin sheet means 10, to thereby secure the thin sheet means 10 to the one side 20a of the image sensing head 20.

What is claimed is:

1. An image sensing head comprising:
a block positioned against a document surface;
a multiplicity of light emitting optical fibers arranged vertically in a row within said block in such a manner that sensing side end portions of said light emitting optical fibers are exposed at one side of the block and light emitting side end portions thereof are exposed at an opposite side of the block;
a multiplicity of light receiving optical fibers arranged vertically in a row within said block in such a manner that sensing side end portions of said light receiving optical fibers are exposed at said one side of the block and light receiving side end portions thereof are exposed at the opposite side of the block;
a multiplicity of light emitting elements located in positions corresponding to the light emitting side end portions of the light emitting optical fibers;
a multiplicity of light receiving elements located in positions corresponding to a selected one or ones of the light receiving side end portions of the light receiving optical fibers;
wherein the improvement comprises:
a thin sheet means formed with an opening in a portion thereof which is in face-to-face relation to the sensing side end portions of the light emitting optical fibers and light receiving optical fibers, said thin sheet means being attached to said one side of the block, so that a predetermined clearance can be maintained between the sensing side end portions of the light emitting optical fibers and the light receiving optical fibers, and a document surface by virtue of the thickness of the thin sheet means.

2. An image sensing head as claimed in claim 1 wherein opposite end portions of said thin sheet means are bent in a direction away from the document surface.

3. An image sensing head as claimed in claim 2, wherein said thin sheet means is formed with notch portions at said opposite end portions thereof, said notch portions receiving a pair of projections formed in the block when the thin sheet means is attached to said one side of the block of the image sensing head.

* * * * *